USOO5649205A

United States Patent [19]
Martins

[11] Patent Number: 5,649,205
[45] Date of Patent: Jul. 15, 1997

[54] FILE RETRIEVAL SYSTEM

[76] Inventor: Augusto Baronio Martins, 777-58 San Antonio Rd., Palo Alto, Calif. 94303

[21] Appl. No.: 376,682

[22] Filed: Jul. 7, 1989

[51] Int. Cl.$^6$ ..................................................... G06F 17/30
[52] U.S. Cl. ....................................................... 395/712
[58] Field of Search .............................. 364/200 MS File, 364/900 MS File, 200, 900, DIG. 1, DIG. 2; 395/600 MS File, 650 MS File, 700 MS File, 425, 600, 656, 750, 712

[56] References Cited

U.S. PATENT DOCUMENTS

| 4,453,217 | 6/1984 | Boivie ........................................ | 364/200 |
| 4,791,556 | 12/1988 | Vilkaitis .................................... | 395/700 |
| 4,945,475 | 7/1990 | Bruffey et al. ............................. | 364/200 |
| 5,008,820 | 4/1991 | Christopher, Jr. et al. ................ | 364/200 |

OTHER PUBLICATIONS

Rob Hahn: 1987 Macworld Dec. 1987 The Finder in a Desk Accessory—Disktools II.200.
Sommerson: PC Magazine DOS Power Tools p. 1072 PEEK 1988.
Gail Todd: 1988 Using Word Perfect Series 5 Edition. "Word Search" p. 229, Osborne McGraw Hill, Berkely, California.
Apple Computer Co: 1987 The Mackintosh S.E. Step by Step.
Robert C. Eckhardt: 1987 Macworld Aug. 1987 A Portable Finder—Disktop 2.00.
McGilton et al., Introducing the Unix System, 1983 pp. 138-149, 495-496.
UNIX Programmer's Manual, Bell Telephone Laboratories, 1983 pp. 67-68, 70-71, 154.
UNIX User's Handbook, 1985 pp. 154-159.
Knuth 1973 The Art of Computer Programming vol. 3/Sorting and Searching. Addison-Wesley Publishing Company Menlo Park, California pp. 139-140.
Coffin 1988 UNIX The Complete Reference. Osborne McGraw-Hill, Berkeley, California. pp. 169-173.
Sommerson 1988 PC Magazine DOS Power Tools. Bantam Books, Inc. New York, New York. pp. 1101-1102.

Primary Examiner—Thomas G. Black
Assistant Examiner—John C. Loomis

[57] ABSTRACT

A process is disclosed for a computer of known type, to retrieve files from its disk storage system, based on the files' specification and or directory information about said files or a string within the set of files specified. Said retrieval may be limited to a single directory, or extend to all the subdirectories subordinate to said directory or extend to two or more independent directories on the same or different disks optionally including subdirectories subordinate to said directories, or extend to the entire disk storage system on said computer. Said string search can be limited to less than the entire file to speed up the selection. The retrieved files are stored as a list in said computer's memory, sorted by file extension and filename, and displayed for processing one more or all of the files in said list by any file command or processor on said computer, until said list is exhausted by the operation of the delete command which deletes files from the disk or the move command which moves a file to a different directory or until the search list itself is deleted whereupon only files in the current directory are processed by said commands and processors.

20 Claims, 1 Drawing Sheet

FILE RETRIEVAL SYSTEM

BACKGROUND

1. Technical Field

This invention relates to a process of retrieving a list of files, based upon specified search criteria into a computer's memory, and providing said list to other file processors to act upon selectively.

2. Description of Prior Art

Many computer operating system enable the computer's disk storage system to be structured into directories that can be arranged hierarchically, relative to each other. Examples of such operating systems are UNIX, XENIX, DOS, OS/2. Such systems provide an efficient means for organizing a large number of files.

UNIX is a registered trademark of AT&T Bell Laboratories. XENIX is a registered trademark of Microsoft Corporation. MS-DOS is a registered trademark of Microsoft Corporation. OS/2 is a trademark of International Business Machines Corporation.

One of the major frustrations of working with such systems, is the need to specify the path to the directory to access any file resident therein.

Several software products have addressed this problem by presenting a graphical representation of the directory hierarchy or the tree as it is more commonly called. The user can roam through the tree, position on a single directory and access the files within it.

Other software products have been developed based on the premise that the user may not always know where a particular file resides. Indeed, the user may not even know the name of the file but may need to locate files based on some string within the file.

Accordingly, software programs exist that can search an entire disk for files matching a given file specification or files that contain a given string. The path and the names of the files retrieved may be displayed on the screen or printed.

However, it would be highly desirable to make the files retrieved by the above process available to other file processors like edit, copy, move, delete, etc. For example, a user might like to gather together all files with the extension BAT, edit some as as desired and move some to a directory named BATCH. Or a user might like to view all letters addressed to Mary Jones.

No existing program is apparently able to perform either of the above tasks.

One of the more powerful commands available on any system is the command FIND in UNIX (Coffin 1988 UNIX: The Complete Reference, pgs. 169–173). FIND can retrieve files based on information about that file such as file name, size, attributes, etc. i.e. directory information about that file. FIND also is able to execute any command on the files retrieved. However, FIND lacks the ability to execute any command selectively only on some of the files retrieved. FIND also lacks the ability to retrieve files based on the information contained inside the file, such as a string. FIND is also difficult to use.

SEARCH is the name of an utility from PC Magazine (Somerson 1988 P. C. Magazine DOS Power Tools, pgs. 1101–1102). SEARCH can retrieve files based on a file specification and a string, and display or print the file names. SEARCH cannot execute any command on the retrieved files.

Searching for strings within large files can be very time consuming. Quite often, the string is on the first page of the file or can be placed on the first page or block of the file by building a table of contents. For example, programmers often need to determine which programs call a particular routine. The list of routines called is usually placed right at the top of the program. Therefore, if the subroutine is not found within the first few thousand bytes, it is pointless to search the entire file. Accordingly, it would be useful to provide the user the option to limit the string search to less than the entire file.

Another draw back of existing products is that the retrieved files are displayed in the order in which they are stored in the disk storage system. It would be desirable to have the list of retrieved files sorted alphabetically.

SUMMARY OF THE INVENTION

The above review of prior art discloses that the need to retrieve files based on information about them or inside them has been well recognized. However, a need exists to make string searches more flexible and to fully utilize the benefits of the search by making the retrieved files available to other file processors.

Accordingly, the objects and advantages of this invention are:

1. Retrieve files based on the file's specification and/or directory information or a string within the set of files specified.
2. Limit said retrieval to a single directory, or extend it to all subdirectories subordinate to said directory, or extend it to two or more independent directories on the same or different disk optionally including subdirectories subordinate to said directories, or extend it to the entire disk storage system.
3. Limit the string search to less than the entire file, when desired.
4. Store a list of retrieved files such that said list can be sorted alphabetically and made available to any file command or processor provided on the computer, for processing one, more or all of the files in said list.

DETAILED DESCRIPTION OF THE INVENTION

The Computer Program

Figure 1:
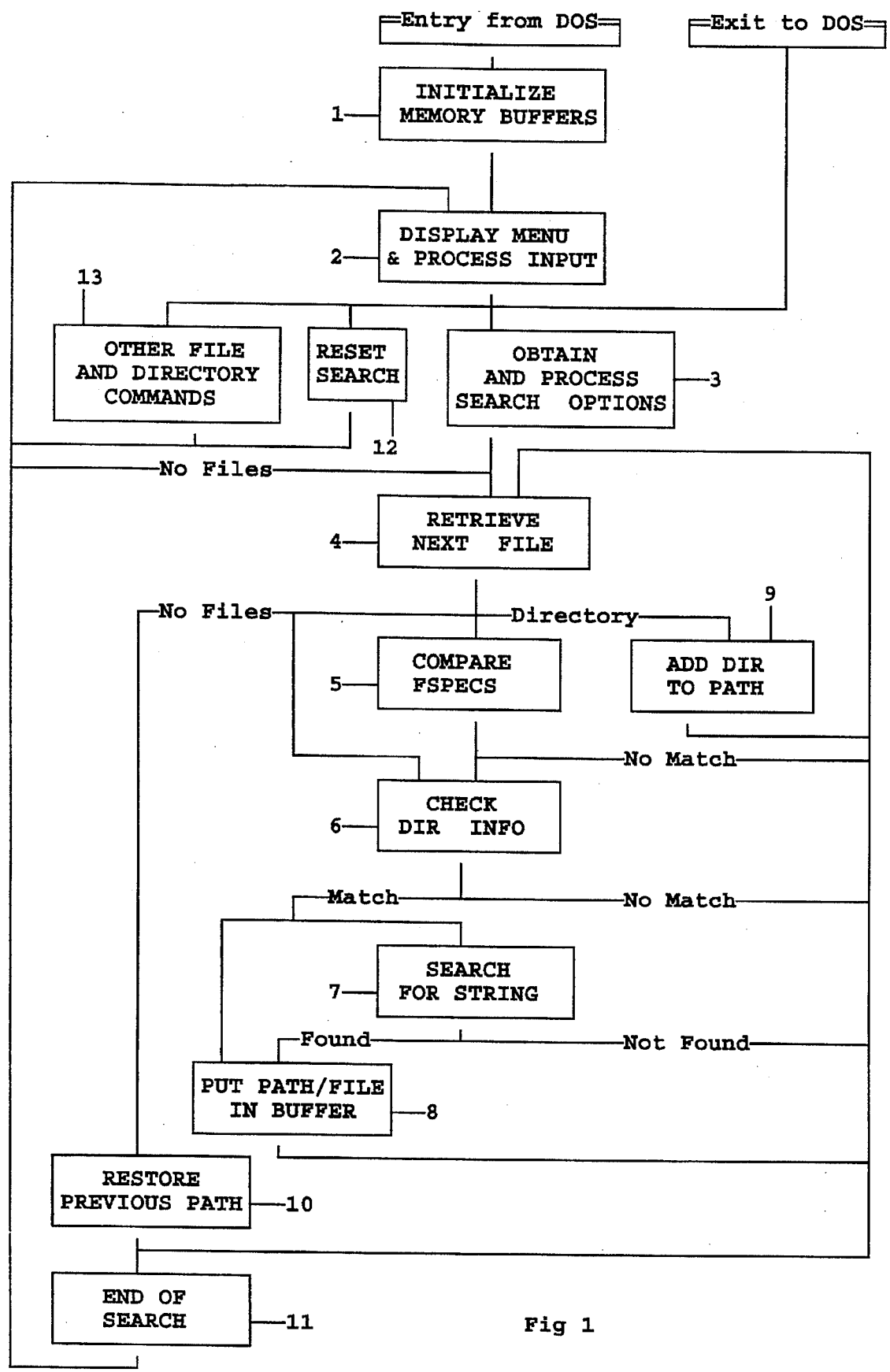
FIG. 1 is the flow chart of the computer program, according to the invention.

The invention comprises a computer program which performs the various functions required. Said program consists of a file retrieval program which is embedded in a larger program, hereinafter called the driver, which provides a menu driven interface to said retrieval program as well as other file commands and processors available on the computer.

There are many such drivers on the market and the subject is well known to prior art. Details of coding of the driver of this invention, and its set up, will be presented to the extent necessary to implement the unique features of this invention and otherwise generally to provide a coherent picture of the entire system.

There are many ways to implement a computer program of this invention. Some of these are dictated by the type of the computer and the operating system. Described below is the preferred embodiment of this invention as implemented for personal computers running under DOS versions 2.0 or above.

To perform its tasks, said driver needs certain information, e.g. the location of the various file commands or file processors.

In the preferred and actually implemented embodiment of this invention, some commands are built into said driver. These are APPEND to append files; ATTRIBUTE to change file attributes; COPY; MOVE to MOVE files from one directory to another and/or rename them: DELETE; KWIK-LOOK to display files on the screen and perform various tasks. Likewise directory commands are built into said driver. Details of their function or coding will not be described further here, since the subject is known to prior art and is not the object of this invention. However, details of their execution in the context of this invention will be described later.

The following DOS file commands are executed with the DOS exec function: XCOPY, PRINT, COMP, BACKUP and RESTORE. Said driver looks for said commands in a directory named DOS in the root directory of the boot drive. This drive is identified to said driver through a separate setup program.

In addition, the user may name external file processors, such as editors, word processors, etc., through the said setup program. These external file processors are also executed with the DOS function exec. Details of this process will be described later.

The setup program accepts the letter designation of the boot drive, the names of the file processors and their directory locations, as provided by the user, and stores them in appropriate locations in the object code of said driver. The user is asked to name one system Editor. It should be able to function independently as a stand alone product and the user is asked to store said editor in the directory DOS, together with the DOS commands. The default editor is EDLIN, the editor that is provided with DOS.

All commands, whether internal to said driver or DOS commands, or external processors as described above, are assigned an FKEY and are invoked by pressing its respective fkey. The file retrieval program of this invention is an internal command within said driver and is assigned the command name SEARCH and its own FKEY.

FIG. 1 is a flow chart of the main tasks performed by said driver and its command SEARCH, and are described more fully below:

1. INITIALIZE MEMORY BUFFERS, etc.
1.1 Creates buffers in memory at the end of code.
   A minimum of five buffers are required:
   File List Buffer to hold information about the file, such as file name, extension, size, etc. In the preferred and actually implemented embodiment of this invention the buffer is large enough to hold information on 100 files. Each file record is 36 bytes.
   Path List Buffer to hold the full path of each file retrieved by the said command search. Each path record is 67 bytes.
   DTA (Disk Transfer Address) Buffer sufficient to hold 32 DTAs. Each DTA is 43 bytes long.
   File Index Buffer to hold the offsets of selected files in the file list buffer.
   File Text Buffer to store the actual contents of a file. It is set to 60K BYTES.
   The file list buffer is contiguous with the path list buffer such that when file commands other than SEARCH are being processed, the file list buffer extends into the path list buffer to store additional files.
   Each buffer is assigned a start pointer and an end pointer.
   Other buffers may be created such as for directory lists or tree, etc. but are not required specifically for this invention.
1.2 The end pointer to the file index buffer is set to the start of said buffer and the buffer is initialized with zeros.
1.3 The search flag and the file counter are initialized to 0.
1.4 The current path is read into the current path buffer in the driver's data area.
2. DISPLAY MENU AND PROCESS INPUT.
2.1 Displays commands menu.
2.2 Prompts user for input.
2.3 Processes the input.
   If the user presses the FKEY for the search command processing continues at task 3.1
   If the user presses a valid FKEY for any other file or directory command processing continues at task 13.
   If the user presses Alt and S keys simultaneously, processing resumes at task 12.1.
   If the user wants to quit, the program exits to DOS.
   If none of the above is true, the program issues an appropriate error message and loops back to task 2.2
3. OBTAIN AND PROCESS SEARCH OPTIONS.
3.1 If search flag is 0, processing continues at task 3.2, else the previous search parameters saved in task 3.6 are restored and processing resumes at task 3.8.
3.2 Obtains file specification and converts it to upper case. The file specification may contain wild cards. Terminates said specification with a 0 and saves its length. The default is the universal file specification "*.*".
3.3 Obtains search options based on directory information, as follows:
   (a) Include subdirectories in search?
      If subdirectories are to be included, the search attribute is set to 16 else it is set to 0. The default is no subdirectories.
   (b) Retrieve read_only, hidden or all files?
      The indicated action is stored in a memory variable. The default is normal files. If hidden or all files are specified, the search attribute is increased by 6.
   (c) Retrieve small, medium or big files?
      The indicated action is stored in a memory variable. The default is all files, irrespective of size.
   (d) Retrieve files modified upto a week ago, a month less, a year or less, or more than a year ago?
      The indicated action is stored in a memory variable. The default is all files irrespective of filing date. If an action is specified, the current date is obtained and is subtracted by a week, a month or a year as specified and stored as search date, in DOS date format.
3.4 Obtains search string specification and stores it upper case. Determines length of said string, saves it in a memory variable, sets string option to 1. If string is not entered, the string option is set to 0.
3.5 Obtains search range specification. The user is prompted to opt for a page, a block or the entire file.
   If a page is to be searched, the number of bytes to read is set to 2 k, else if a block is to be searched said number is set to 8 k, else if the entire file is to be searched said number is set to 32 k. The default is a block.
3.6 The number of bytes to read, the search string and its length, the file specification and its length are stored in duplicate, so that the search options can be restored when desired.

3.7 Initializes the end pointers to the file list buffer and the path list buffer to the start of the respective buffer.

3.8 Initializes the end pointer to the DTA buffer to the start of said buffer. Sets the first DTA at the start of the DTA buffer.

3.9 The path string is saved in an appropriate buffer in the driver's data area.

3.10 If search begins in the root directory, the path level pointer is set to 0 else it is set to 1. There are two path level pointers: one for the start level, the other for the current level.

3.11 If the search attribute is 16 or above, moves the universal file specs to the end of current path, else moves the file specification input by the user to the end of current path.

3.12 Issues search first instruction.

3.13 If no files, processing resumes at task 2.2 else processing continues at task 4.4.

4. RETRIEVE NEXT FILE 4.1 If file counter=100, processing continues at task 11.1.

4.2 Issues search next instruction.

4.3 If no files, processing resumes at task 10.1.

4.4 Retrieves one file, matching the file specification at the end of current path, from the current directory to the current DTA.

4.5 Checks the file attribute of the retrieved file. If the attribute is 16, processing resumes at task 9.1, else if the search attribute is below 16, processing resumes at task 6.1.

5. COMPARE FSPECS 5.1 Compares the file name and extension of the retrieved file currently in DTA with the file specification input by the user. If there is no mismatch, processing continues at task 6.1.

If the mismatched character in the user's file specification is the wild card '?', ignores the mismatch and continues with the comparison from the next character.

If the mismatched character in the user's file specification is the wild card '*', and the file name is being compared, ignores the mismatch and compares the file extensions, else if file extensions were being compared, ignores the mismatch and resumes processing at task 6.1.

5.2 Loops back to task 4.1 and retrieves the next file.

6. CHECK DIR INFO 6.1 Checks the memory variables described in tasks 3.3(b), (c) and (d) in tasks 6.2 to 6.4, respectively. If any of said variables call for default actions, processing skips to the next task, the final jump being to task 6.5.

6.2 Retrieves the file attribute from current DTA. If read only files are specified, tests if bit 0 of the file attribute is set. If set, processing resumes at task 6.3 else processing resumes at task 6.6

If hidden files are specified, tests if bit 1 of said attribute is set. If set, processing resumes at task 6.3 else bit 2 is tested. If set, processing resumes at task 6.3 else processing resumes at task 6.6.

6.3 Retrieves the file size from current DTA. If small files are specified, checks if the file size is less than 4 k, else if medium files are specified checks if the file size is 4 k or greater but less than 64 k, else if big files are specified, checks if the file size is 64 k or greater. If the file is within the range specified, processing continues at task 6.4 else processing resumes at task 6.6.

6.4 Retrieves the file date from the current DTA. The file date is compared against the search date set up in task 3.3(d). If the file date is within the range specified, processing continues at task 6.5 else processing resumes at task 6.6

6.5 If search string is specified, processing continues at task 7.1 else processing resumes at task 8.1.

6.6 Loops back to task 4.1, to fetch the next file matching the specified file specification.

7. SEARCH FOR STRING 7.1 Moves the file name and extension of the retrieved file to the end of the current path and terminates it with a 0.

7.2 Opens said file.

7.3 Reads the contents of said file into the text buffer described in task 1.1. The number of bytes to read was set in task 3.5.

7.4 Converts the text to upper case.

7.5 Searches said text buffer for the specified string.

7.6 If string found, processing continues at task 7.8.

7.7 If searching the entire file, loops back to task 7.3 while end of file is not reached.

7.8 Closes the opened file.

7.9 If string found, processing continues at task 8.1.

7.10 Loops back to task 4.1, to retrieve the next matching file.

8. PUT PATH/FILE IN BUFFER 8.1 Puts the current path including the drive letter into the path buffer beginning at the end pointer location. Terminates the path string with 0 and advances the end pointer by 67 bytes.

8.2 Puts the file name and other directory information from DTA into file list buffer, beginning at the end pointer location. Terminates the string with line feed character and advances the end pointer by 36 bytes.

8.3 Increments the file counter.

8.5 Loops back to task 4.1 to retrieve the next file.

9. ADD DIR TO PATH 9.1 Checks the first letter of the directory name. If it is '.', loops back to task 4.1 to retrieve next file 9.2 Increments current path level.

9.3 Moves the directory name and extension from the current DTA to the end of current path and terminates it with '\'. This is the end of the new current path. Moves '*.*' to the end of current path and terminates with a 0.

9.4 Advances the DTA end pointer by 43 and initializes the new current DTA.

9.5 Issues search first and search next instructions and loops back to task 4.1.

10. RESTORE PREVIOUS PATH 10.1 If current path level is same as start path level, processing resumes at task 11.1.

10.2 Scans current path backwards from the end of path and locates the character '\' that marks the end of the previous directory. Moves the universal file specs to the end of the previous path, and terminates the path with a 0.

10.3 Subtracts 43 from the current DTA pointer and restores the the previous DTA.

10.4 Loops back to task 4.1 to retrieve the next file.

11. END OF SEARCH 11.1 Terminates the path and file lists with an end of file mark, and saves the end of list locations.

11.2 If the search were unsuccessful, displays a warning message and loops back to task 2.2

11.3 If the number of files retrieved is one, processing resumes at task 11.5

11.4 Sorts the search list by file extension then by file name. The same sort routine is used, whether the file list being sorted is a search list or otherwise. The method used is known as straight selection sort (Knuth 1973 The Art of Computer Programming Vol 3/Sorting and Searching pgs. 139–140). At start, two sets of pointers are initialized, one pointing to the file list buffer and the second to the path list buffer. The two sets of pointers are moved in unison such that when a particular file record gets moved to a different location in the file list buffer, the corresponding path record in the path list buffer gets moved to the same relative position within said buffer.

11.5 Sets the search flag to 1 and displays the number of files retrieved. Also displays a visual reminder on the screen that remains on the screen until erased by pressing Alt and S keys simultaneously. Said reminder is the phrase "AltS" displayed highlighted at the bottom of the screen, in an area reserved for this purpose.

11.6 Loops back to task 2.2.

12. RESET SEARCH 12.1 The AltS phrase is unhighlighted, the search flag and the file counter are reset to 0. If the disk changed, it is reset to the original disk at the time of entry to the search program and the path reset from the string saved in task 3.9.

12.2 Loops back to task 2.2.

13. OTHER FILE AND DIRECTORY COMMANDS 13.1 Checks the search flag.

If said flag is 0, the user is asked for file specification, the matching files from the current directory are retrieved and stored in the file list buffer as previously described. After retrieval is complete, the file list is scrolled on the screen and the user can select one, more or all files for submission to the previously invoked file command or external processor.

If said flag is 1, the retrieved files are already in the file list buffer. The search list is scrolled on the screen for the user to select one, more or all files for submission to the previously invoked file command or external processor.

13.2 In the preferred and actually implemented embodiment of this invention, the user selects a desired file by moving the cursor to said file and pressing the space bar.

The offset of the selected file in the file list buffer is determined from the offset of the file at the top of the screen and the row number of the selected file. The file index buffer, described in task 1.1, is scanned for said offset. If not found, the offset is stored at the end of said buffer and the end of buffer pointer incremented by two. If found, the offset is deleted from the index by moving any succeeding offsets in the index backwards by two bytes. The end of buffer pointer is decremented by two.

Selection is indicated on the screen by a marker at the start of the selected file. Pressing the spacebar on a previously selected file, unselects the file and erases the marker. If no files are selected, the user is given the option of selecting all files, thus eliminating the tedium of selecting each and every file manually.

13.3 If the search flag is 1, each selected file is processed individually.

File processing proceeds in the order in which the files are selected. If all files are selected, processing starts sequentially from the start of the file list buffer, else processing starts from the start of the index buffer.

From the offset of the selected file in the file list buffer, the relative position of said file from the start of said buffer is determined from the following equation:

(File Offset−Start of File List Buffer)÷Record Length

From the relative position of the file in the file list buffer, the offset of the path to said file in the path list buffer is determined from the following equation:

Relative Position*Record Length+Start of Path List Buffer

If the invocation is for an internal command, the current path is set to the path of the selected file, and the file specification is passed to said command.

If the invocation is for a DOS command, the current path is set to the path of the selected file. Said command is invoked with the DOS exec function and the name of the selected file is passed to said command as a parameter string. If said command has various options, the user is prompted for the options which are also passed to the command as part of the parameter string following the file specification.

The system editor is treated exactly as a DOS command, even though it may be an external processor.

If the invocation is for any other external file processor, the current path is set to the path of said file processor. Said processor is invoked with the DOS exec function and the path and file name of the selected file are appended together to form a valid file specification and passed to said processor as a parameter string.

13.4 After, the file command or processor completes processing, the file index buffer is initialized with zeros and the end pointer is set to start of said buffer. Processing resumes at task 2.2

Operation of the Invention

On entry from DOS, the search flag is set to 0, and the current drive and path are stored in the driver's data area, with a call to DOS. The end of path is stored in a memory variable and is updated each time the path changes.

If the SEARCH command is invoked, search begins in the current directory and may extend to its subdirectories as specified above. The user can invoke the CHANGE DIRECTORY command to change the current directory, prior to invoking the search command. In the preferred and actually implemented embodiment of this invention, the change directory command also allows the user to change drives.

After the search completes, the user is informed of the number of files that meet the specified search criteria. If the search is successful, the search flag is set to 1 and a visual indication is displayed on the screen to indicate that a search list exists and that from now on, all file commands and processors accessed through said driver will act on the files in said search list.

By initiating the search in the root directory, the entire disk may be searched. After a search completes, the disk may be changed and the same search continued in the new disk. Any new files retrieved will be added to the previous list. To start a new list, the user presses Alt and S keys as described above.

The search list is available for processing by repeated invocations of the same or different commands or file processors, until it is exhausted by the operation of the delete command which deletes the file from the disk or the move command which moves the file to a different directory or until the search list itself is deleted by pressing Alt and S keys simultaneously, as described above.

CONCLUSION AND SCOPE OF THE INVENTION

As the reader will see, this invention provides a versatile system to retrieve files based on a variety of search criteria about the file or a string inside the file. The search may be limited to a single directory, or extend to all the subdirectories subordinate to said directory or extend to two or more independent directories on the same or different disks optionally including subdirectories subordinate to said directories, or extend to the entire disk storage system on said computer.

The ability to limit the search to the first page (2 k bytes) or the first block (8 k bytes) provides the user with a powerful text retrieval system. Large files can be set up with a table of contents or an index at the top of the file. The files can then be selectively retrieved based on their entire content by searching through a small fraction of that content.

Finally the search list is available for processing by other file commands or processors available on the computer.

While the above description of the invention contains many specificities, these specificities should not be construed as limitations on the scope of the invention. Rather, they are an exemplification of one preferred embodiment.

For example, in the preferred and actually implemented embodiment of this invention, the search list is setup as the default list. Instead, the user could have been given the option to choose between the search list and the files on the current directory. Or the search lists retrieved through different retrieval strategies could have been saved to disk under unique names and recalled as desired.

Other examples: A computer program, according to this invention, could be set up so it retrieves files based on actual values supplied by the user rather than symbols signifying predefined ranges, for file size, filing date, or number of bytes to search.

The maximum number of files that may be retrieved has been set to 100. It is an arbitrary figure that could have been set higher or lower.

The search list could be sorted by other parameters such as file size, date, etc.

The significant novel features of this invention are the ability to store the retrieved files as a list in the computer's memory such that said list can be sorted in any desired manner and presented repeatedly to any file command or processor provided on the computer, for processing one, more or all of the files in said list, and the ability to limit string searches to less than the entire file, when desired. Other features of this invention are unique because of combination with other desirable features. All these features join together to produce a very user friendly product.

While the greatest advantages and benefits from this invention will accrue to computers with operating systems like Unix, Dos, etc that can structure their disk or disks into directories that can be arranged hierarchically relative to each other, it should prove no less useful in any big system containing large number of files, howsoever arranged or structured.

Thus on the IBM's VM/CMS operating system, a computer program according to this invention, could be set up to search one or more of the attached minidisks. Indeed, said program could be automated so that by default all attached minidisks are searched. The same thing could be done with programs designed for the personal computer. However there are disadvantages to providing this facility on personal computers which have removable disks. IBM is a registered trademark of International Business Machines Corporation. VM/CMS is a multiuser system generally installed on IBM's mainframe and large mini computers.

I claim:

1. A method of operating a computer, said computer comprising a dick storage system, main memory and a plurality of external file commands processors, to retrieve files from one or more directories and its associated subdirectories stored on one or more disks which comprise said disk storage system, based on search options supplied by an user of said computer and making the retrieved files available as a list of said files to said user for further processing by other file commands or processors on said computer, comprising the stops of:

(a) retrieving files based on the following:
      (1) the files' specification;
      (2) directory information about said files;
      (3) searching through the contents of said files for a predetermined string;
   (b) storing the retrieved files as a list of files in the main memory of the computer, said list comprising the file specific at of each retrieved file and, optionally, directory information about said file;
   (c) displaying said list to said user;
   (d) said user selecting and submitting any of said files in said list to any file command or processor on said computer;
   (e) repeating step (d) as often as desired by said user so that files from the same list may be submitted to same or different file command or processor on said computer.

2. The method of claim 1 further comprising the step of sorting said list according to any of the information stored therein.

3. The method of claim 1 further comprising the step of limiting the search for said string to less than the entire file.

4. The method of claim 1, wherein some or all of the file commands or processors available on the computer are set up as a menu, said menu comprising a plurality of said external file commands or processors, said method further comprising the steps of:

(a) displaying the menu of file commands or processors to the user;
   (b) the user submitting selected files to any command or processor displayed on said menu.

5. The method of claim 4 further comprising the step of sorting said list according to any of the information stored therein.

6. The method of claim 4 further comprising the step of limiting the search for said string to less than the entire file.

7. A method of operating a computer, said computer comprising a disk storage system, main memory and a plurality of external file commands or processors, said disk storage system comprising one or more disks organized into directories and associated ksub-directories in a hierarchal arrangement, to retrieve files from said disk storage system based on search options supplied by an user of said computer, and making the retrieved files available as a list of said files to said user for further processing by other file commands or processors on said computer, said method comprising the steps of:

(a) retrieving files based on one or more search options selected from the group consisting of:
      (1) the files' specification,
      (2) the directory information about the files,
      (3) searching through the contents of the file for a predetermined string;
   (b) retrieving files from any one or more directories and their associated sub-directories;
   (c) storing the retrieved files as a list of files in the main memory of the computer, said list comprising the file specification of each retrieved file and optionally, directory information about said file;

(d) displaying said list to said user;

(e) said user selecting and submitting any one or more of said files in said list to any file command or processor on said computer;

(f) repeating step (e) as often as desired by said user so that files from the same list may be submitted to same or different file command or processor on said computer.

8. The method of claim 7 further comprising the step of sorting said list according to any of the information stored therein.

9. The method of claim 7 further comprising the step of limiting the search for said string to less than the entire file.

10. The method of claim 7, wherein some or all of the file commands or processors available on the computer are set up as a menu, said menu comprising a plurality of said external file commands or processors, said method further comprising the steps of:

(a) displaying the menu of file commands or processors to the user;

(b) the user submitting selected files to any command or processor displayed on said menu.

11. The method of claim 10 further comprising the step of limiting the search for said string to less than the entire file.

12. A method of operating a computer, said computer comprising a disk storage system, main memory and a plurality of external file commands or processors, to retrieve files from said disk storage system, based on search options supplied by an user of said computer, and making retrieved files available as a list of said files to said user for further processing by other file commands or processors on said computer, said method comprising the steps of:

(a) retrieving files based on one or more of the following:
 (1) the files ' specification;
 (2) the directory information about said files;

(b) storing the retrieved files as a list of files in the main memory of the computer, said list comprising the file specification of each retrieved file or any other information descriptive of said retrieved file;

(c) displaying said list to said user;

(d) said user selecting and submitting any one or more of said files in said list to any file command or processor on said computer;

(e) repeating step (d) as often as desired by said user so that files from the same list may be submitted to same or different file command or processor on said computer.

13. The method of claim 12, further comprising the step of retrieving files by searching through the contents of the files for a predetermined string.

14. The method of claim 13 further comprising the step of limiting the search for said string to less than the entire file.

15. The method of claim 12, in a computer wherein said disk storage comprises one or more disks organized into directories and associated sub-directories, said method further comprising the steps of:

(a) retrieving files from any one or more directories and their associated sub-directories.

16. The method of claim 15, further comprising the step of retrieving files by searching through the contents of the files for a predetermined string.

17. The method of claim 16 further comprising the step of limiting the search for said string to less than the entire file.

18. The method of claim 12, wherein some or all of the file commands or processors available on the computer are set up as a menu, said menu comprising a plurality of said external file commands or processors, said method further comprising the steps of:

(a) displaying the menu of file commands or processors to the user;

(b) the user selecting said files to any command or processor displayed on said menu.

19. The method of claim 18, further comprising the step of retrieving files by searching through the contents of the files for a predetermined string.

20. The method of claim 19 further comprising the step of limiting the search for said string to less than the entire file.

* * * * *